US 9,399,306 B2

(12) United States Patent
Pierce et al.

(10) Patent No.: US 9,399,306 B2
(45) Date of Patent: Jul. 26, 2016

(54) PIPE MACHINING APPARATUSES AND METHODS OF OPERATING THE SAME

(71) Applicant: Illinois Tool Works Inc., Glenview, IL (US)

(72) Inventors: Kenneth R. Pierce, Arlington Heights, IL (US); Michael W. Gearhart, Prospect Heights, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 404 days.

(21) Appl. No.: 13/792,845

(22) Filed: Mar. 11, 2013

(65) Prior Publication Data

US 2014/0190327 A1    Jul. 10, 2014

Related U.S. Application Data

(60) Provisional application No. 61/750,447, filed on Jan. 9, 2013.

(51) Int. Cl.
*B26D 5/00* (2006.01)
*B26D 7/26* (2006.01)
(Continued)

(52) U.S. Cl.
CPC .............. *B26D 7/2614* (2013.01); *B23B 3/26* (2013.01); *B23B 5/163* (2013.01); *B23D 21/04* (2013.01);
(Continued)

(58) Field of Classification Search
CPC ........ B26D 7/2614; B26D 3/16; B26D 3/166; B23Q 9/0021; Y10T 403/595; Y10T 83/68; B23D 21/04; B23B 5/163; B23B 3/26
USPC ...................................... 82/113, 128; 83/745
See application file for complete search history.

(56) References Cited

U.S. PATENT DOCUMENTS 768,128 A    5/1904    Jackson
1,074,334 A    9/1913    Vosper
(Continued)

FOREIGN PATENT DOCUMENTS

DE    3521697 A1    2/1986
GB      818753 A    8/1959
(Continued)

OTHER PUBLICATIONS

International Search Report and Written Opinion for PCT/US2013/077719 dated Jul. 4, 2014, 18 pages.
(Continued)

*Primary Examiner* — Omar Flores Sanchez
(74) *Attorney, Agent, or Firm* — Klintworth & Rozenblat IP LLC

(57) ABSTRACT

Pipe machining apparatuses are provided. In one aspect, a pipe machining apparatus includes a coupling mechanism adapted to couple a first section and a second section of the pipe machining apparatus together. The coupling mechanism includes a base defining an aperture therein, an arm adapted to selectively couple the first and second sections together, an engagement member positioned in the aperture in the base, and a separation member movably coupled to the base and adapted to engage the engagement member. The separation member is adapted to move to push against the engagement member and separate the first section and the second section. In another aspect, a coupling mechanism includes an arm adapted to selectively couple the first and second sections together and a resistance member engaging the arm and one of a first section and a second section of the pipe machining apparatus to which the arm is coupled.

19 Claims, 11 Drawing Sheets

(51) Int. Cl.
  *B26D 3/16* (2006.01)
  *B23D 21/04* (2006.01)
  *B23B 3/26* (2006.01)
  *B23B 5/16* (2006.01)
  *B23Q 9/00* (2006.01)

(52) U.S. Cl.
  CPC ............... *B23Q 9/0021* (2013.01); *B26D 3/16* (2013.01); *B26D 3/166* (2013.01); *Y10T 83/68* (2015.04); *Y10T 403/595* (2015.01)

(56) References Cited

U.S. PATENT DOCUMENTS

| | | | |
|---|---|---|---|
| 1,097,152 A | 5/1914 | Wagner | |
| 1,279,022 A | 9/1918 | Scott | |
| 1,979,966 A | 11/1934 | Farr et al. | |
| RE20,974 E | 1/1939 | Guirl et al. | |
| 2,493,512 A | 1/1950 | Vickers | |
| 2,537,916 A | 1/1951 | Rosenboom | |
| 2,567,833 A | 9/1951 | Warren et al. | |
| 2,635,270 A | 4/1953 | Dawson | |
| 2,902,875 A | 9/1959 | Finally | |
| 3,650,514 A | 3/1972 | Stunkard | |
| 3,665,482 A | 5/1972 | Cresswell | |
| 3,819,163 A | 6/1974 | Stunkard | |
| 3,848,489 A | 11/1974 | Santana | |
| 4,063,355 A | 12/1977 | Netzel | |
| 4,318,391 A | 3/1982 | Wachs et al. | |
| 4,402,136 A | 9/1983 | Rast | |
| 4,490,909 A | 1/1985 | Wachs et al. | |
| 4,543,861 A | 10/1985 | Kwech et al. | |
| 4,614,136 A | 9/1986 | Pertle | |
| 4,625,464 A | 12/1986 | Kubo | |
| 4,655,108 A | 4/1987 | Galos | |
| 4,677,884 A | 7/1987 | Kwech et al. | |
| 4,682,919 A | 7/1987 | Mitchell | |
| 4,739,685 A | 4/1988 | Ricci | |
| 4,762,038 A | 8/1988 | Olson | |
| 4,791,842 A | 12/1988 | Olson | |
| 4,813,314 A | 3/1989 | Kwech | |
| 4,880,340 A | 11/1989 | Taki | |
| 4,939,964 A | 7/1990 | Ricci | |
| 5,054,342 A | 10/1991 | Swiatowy et al. | |
| 5,085,619 A | 2/1992 | Torii | |
| 5,159,868 A * | 11/1992 | Thomas et al. | 83/674 |
| 5,368,399 A | 11/1994 | Tremblay | |
| 5,429,021 A | 7/1995 | Astle et al. | |
| 5,467,627 A | 11/1995 | Smith et al. | |
| 5,549,024 A | 8/1996 | Ricci | |
| 6,257,110 B1 | 7/2001 | Ricci | |
| 6,293,174 B1 | 9/2001 | Rulseh | |
| 6,604,896 B2 | 8/2003 | Feldman | |
| 6,619,164 B1 | 9/2003 | Ricci | |
| 6,634,838 B2 | 10/2003 | Kitamura | |
| 6,810,587 B1 | 11/2004 | Robertson | |
| 6,966,731 B2 | 11/2005 | VanderPol et al. | |
| 7,270,505 B2 | 9/2007 | VanderPol et al. | |
| 8,250,953 B2 * | 8/2012 | Hall et al. | 82/113 |
| 8,584,558 B2 * | 11/2013 | Phillips et al. | 82/113 |
| 8,997,611 B1 | 4/2015 | Walton | |
| 9,021,927 B2 | 5/2015 | Phillips, II | |
| 9,050,669 B2 * | 6/2015 | Coakley | |
| 9,278,417 B2 | 3/2016 | Pierce | |
| 2001/0001935 A1 | 5/2001 | Wilk, Jr. | |
| 2007/0241250 A1 | 10/2007 | Wong | |
| 2009/0229919 A1 | 9/2009 | McDonald | |
| 2010/0162860 A1 | 7/2010 | Hall et al. | |
| 2013/0152748 A1 | 6/2013 | Wokan et al. | |
| 2014/0190322 A1 * | 7/2014 | Pierce et al. | 82/70.2 |
| 2016/0136741 A1 | 5/2016 | Pierce | |

FOREIGN PATENT DOCUMENTS

| | | |
|---|---|---|
| GB | 828940 A | 2/1960 |
| WO | 2007/052035 A1 | 5/2007 |
| WO | 2010/077346 A1 | 7/2010 |

OTHER PUBLICATIONS

International Search Report and Written Opinion for PCT/US2013/077721 dated Aug. 22, 2014, 19 pages.
International Search Report and Written Opinion for PCT/US2013/077718 dated Sep. 5, 2014, 14 pages.

* cited by examiner

PIPE MACHINING APPARATUSES AND METHODS OF OPERATING THE SAME

RELATED APPLICATIONS

The present application claims the benefit of U.S. Provisional Patent Application No. 61/750,447, filed Jan. 9, 2013, the entire contents of which is incorporated herein by reference.

FIELD OF THE INVENTION

The present disclosure generally relates to pipe machining apparatuses and, more particularly, to split frame pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

Existing pipe cutting apparatuses may be large in size and have large profiles or thicknesses, thereby limiting the environments in which the pipe cutting apparatuses may be utilized. Moreover, existing pipe cutting apparatuses may not be used in environments having low clearance or small spaces between adjacent pipes.

Furthermore, the frame sections of a split frame pipe machining apparatus may be large, heavy components, thereby making it difficult to separate the frame sections. Components used to couple and align the frame sections may be damaged when separating or assembling the frame sections.

Split frame pipe machining apparatuses may also be weak at the parting lines due to the presence of the parting line and the absence of structural support.

SUMMARY

The present disclosure is defined by the following claims, and nothing in this section should be taken as a limitation on those claims.

In one aspect, a pipe machining apparatus is provided and includes a first section including a first portion of a frame and a first portion of a tool carrier and a second section including a second portion of the frame and a second portion of the tool carrier. The first section and the second section are adapted to be coupled together around at least a portion of a pipe, the frame is adapted to be fixed relative to the pipe, and the tool carrier is adapted to move relative to the frame and the pipe. The pipe machining apparatus also includes a coupling mechanism including a base, an arm, and a separation member. The coupling member is adapted to couple the first section and the second section together. The base is coupled to one of the frame and the tool carrier and defines an aperture therein. The arm is movably coupled to one of the first section and the second section and is adapted to selectively couple the first and second sections together. The engagement member is positioned in the aperture in the base, and the separation member is movably coupled to the base and adapted to engage the engagement member. The separation member is also movable to push against the engagement member and separate the first section and the second section.

In another aspect, a coupling mechanism for coupling together a first section and a second section of a pipe machining apparatus is provided. The coupling member includes a base defining an aperture therein, an arm movably coupled to one of the first section and the second section and adapted to selectively couple the first and second sections together, an engagement member positioned in the aperture in the base, and a separation member movably coupled to the base and adapted to engage the engagement member. The separation member is adapted to move to push against the engagement member and separate the first section and the second section.

In a further aspect, a pipe machining apparatus is provided and includes a first section including a first portion of a frame and a first portion of a tool carrier, and a second section including a second portion of the frame and a second portion of the tool carrier. The first section and the second section are adapted to be coupled together around at least a portion of a pipe, the frame is adapted to be fixed relative to the pipe, and the tool carrier is adapted to move relative to the frame and the pipe. The pipe machining apparatus also includes a coupling mechanism adapted to couple the first section and the second section together. The coupling mechanism includes an arm movably coupled to one of the first section and the second section and adapted to selectively couple the first and second sections together, and a resistance member engaging the arm and the one of the first section and the second section to which the arm is coupled.

In yet another aspect, a pipe machining apparatus is provided and includes a first section including a first portion of a frame and a first portion of a tool carrier. The first section defines a first section recess therein. The pipe machining apparatus also including a second section including a second portion of the frame and a second portion of the tool carrier. The second section defines a second section recess therein, and the first section and the second section are adapted to be coupled together around at least a portion of a pipe. The pipe machining apparatus further includes a pin including a first end rigidly secured in one of the first section recess and the second section recess and a second end removably positionable in the other of the first section recess and the second section recess. The pin includes an angled portion near the second end and a rounded portion at the second end.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
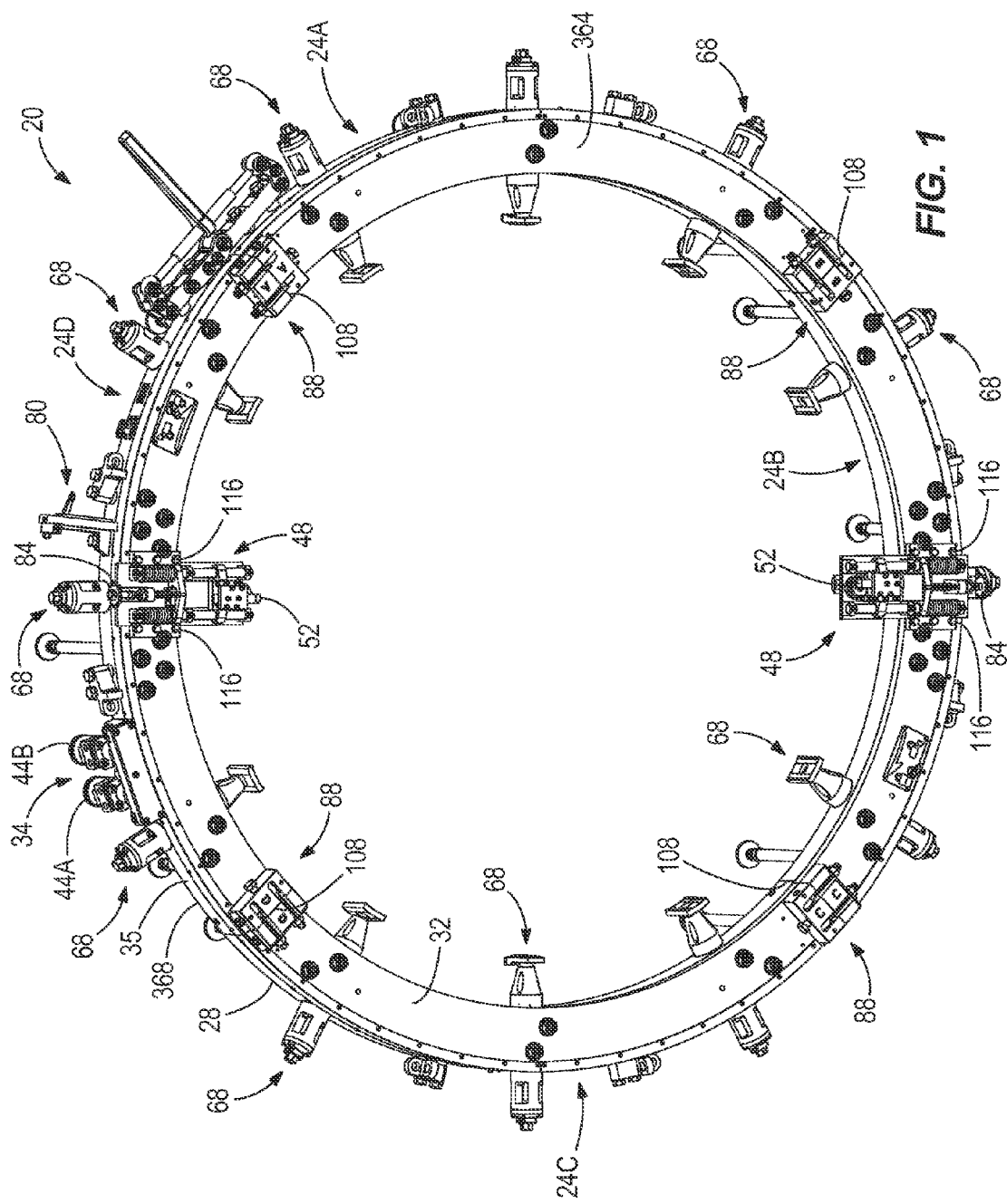
FIG. 1 is a top front perspective view of an exemplary pipe machining apparatus, in accordance with one embodiment.
Figure 2:
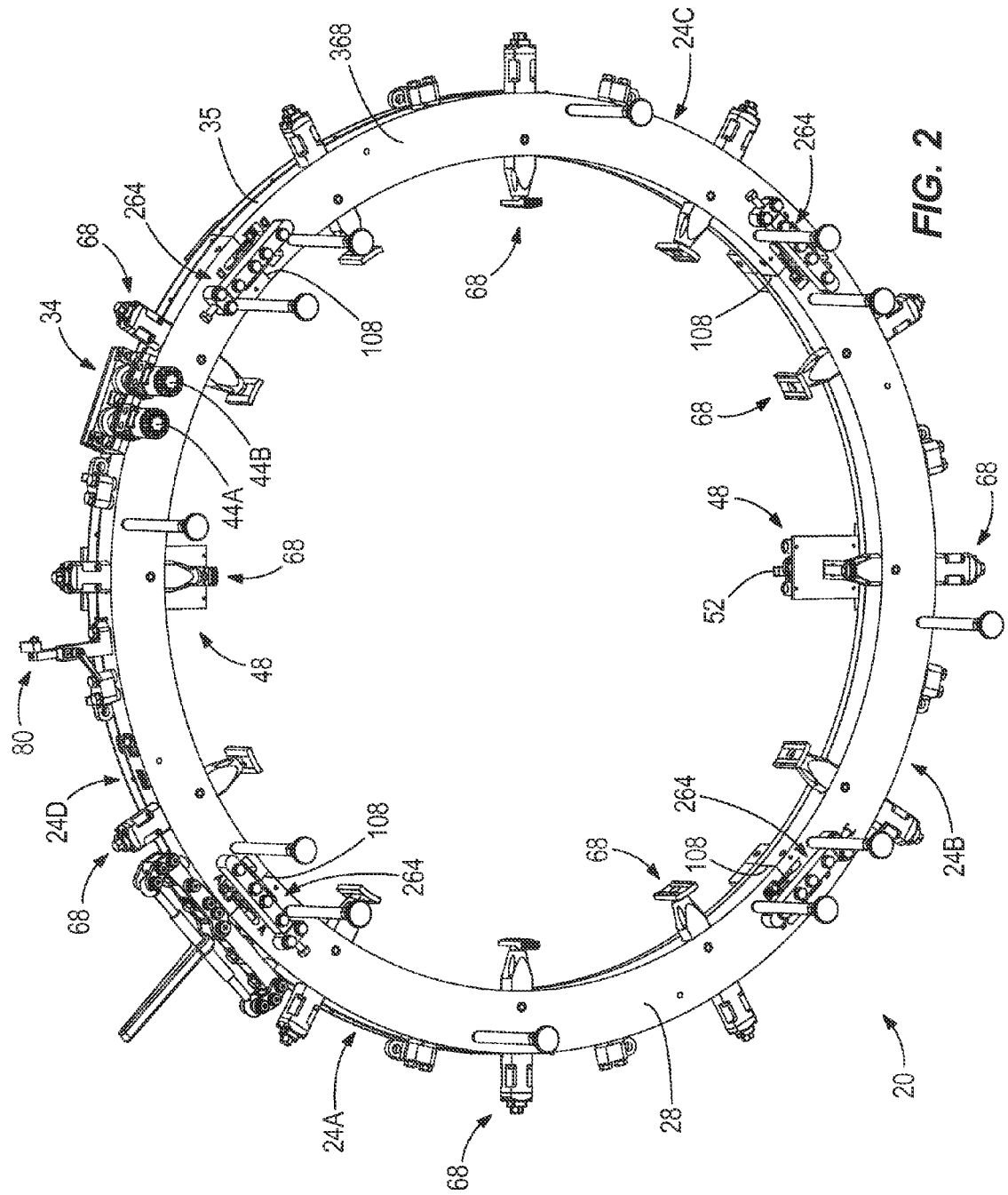
FIG. 2 is a top rear perspective view of the pipe machining apparatus illustrated in FIG. 1, in accordance with one embodiment.
Figure 3:
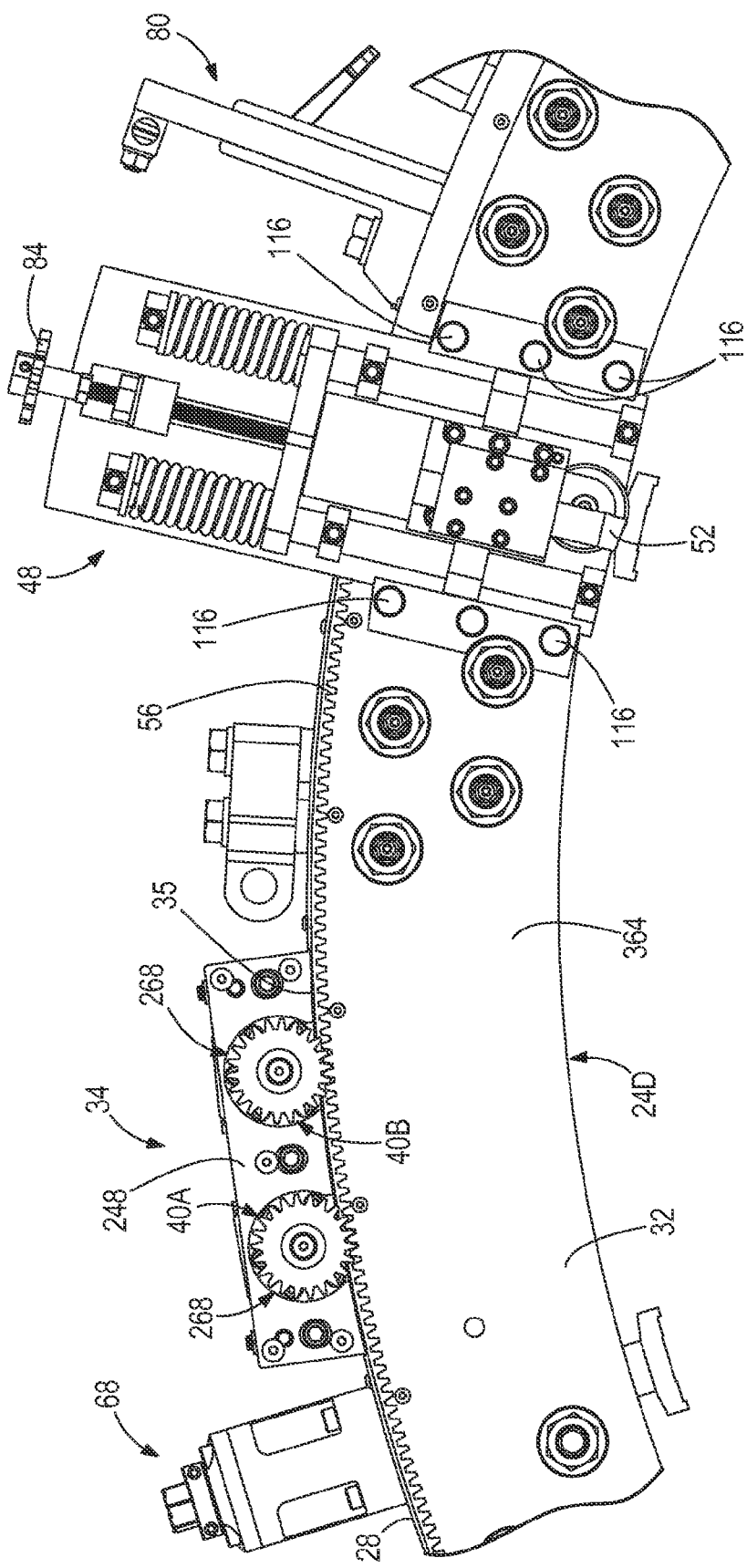
FIG. 3 is a front view of a portion of the pipe machining apparatus illustrated in FIG. 1 with a portion thereof broken away to show meshing of pinion gears and a gear rack of the pipe machining apparatus, in accordance with one embodiment.
Figure 4:
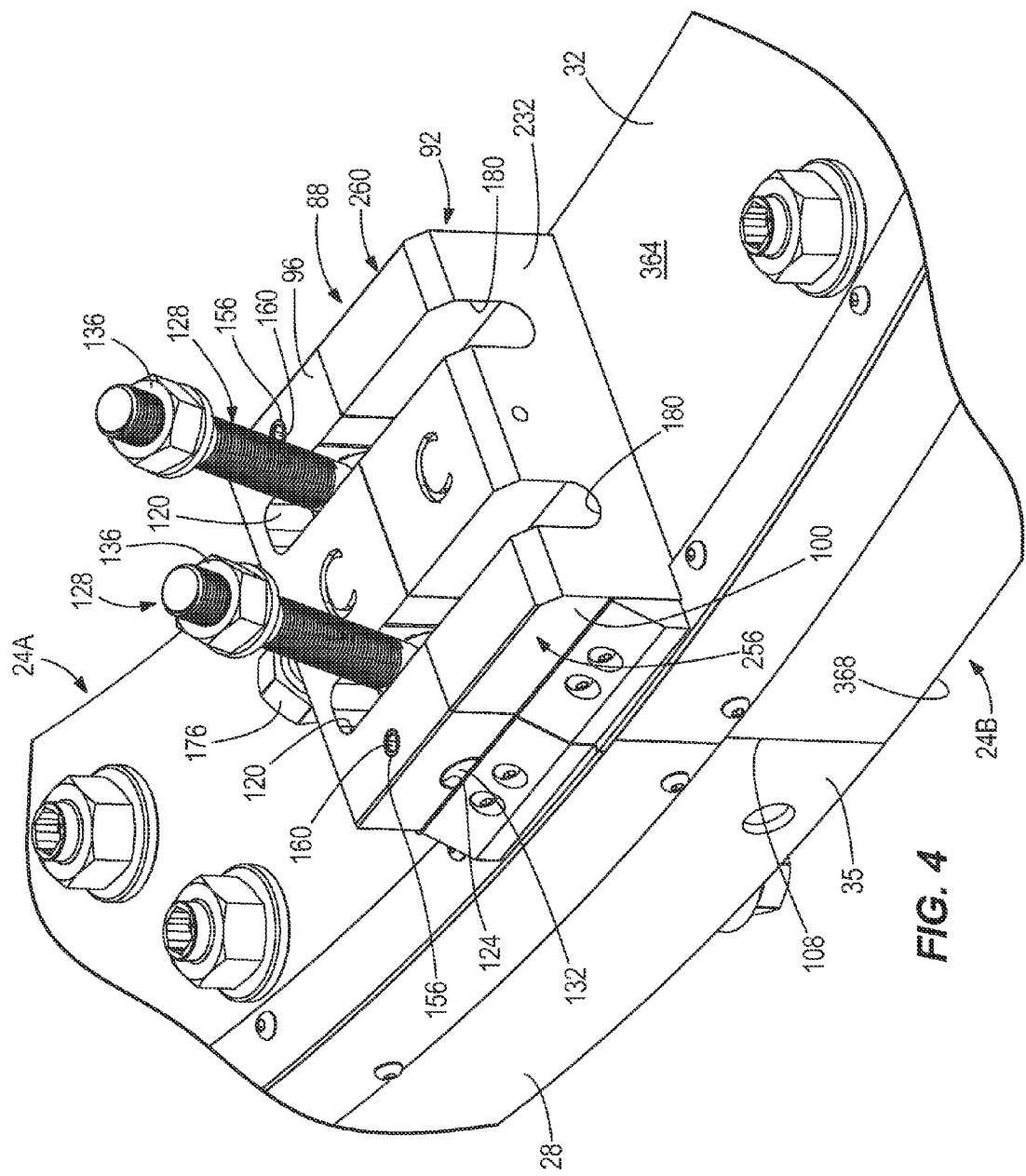
FIG. 4 is a front perspective view of an exemplary coupling mechanism of the pipe machining apparatus illustrated in FIG. 1 with the coupling mechanism shown in an uncoupled position, in accordance with one embodiment.

With reference to FIGS. 1-3, an exemplary embodiment of a pipe machining apparatus 20 adapted to machine pipes of varying diameters is illustrated. In some exemplary embodiments, the apparatus 20 completely cuts through pipes. In other exemplary embodiments, the apparatus 20 prepares an end of a pipe for coupling to another pipe. In still other exemplary embodiments, the apparatus 20 both completely cuts and prepares a pipe for coupling to another pipe. The apparatus 20 is adapted to cut pipes of a variety of different diameters such as, for example, about 60 inches, about 75 inches, about 90 inches, about 105 inches, about 120 inches, less than 60 inches, greater than 120 inches, or any other pipe diameter.

In the illustrated exemplary embodiment, pipe machining apparatus 20 is formed of four joined-together sections 24A, 24B, 24C, 24D and includes a frame 28 and a tool carrier 32. The four joined together sections 24A, 24B, 24C, 24D together comprise the frame 28 and the tool carrier 32. A drive mechanism 34 is coupled to a periphery 35 of the frame 28 and includes a pair of pinion gears 40A, 40B respectively coupled with a pair of suitable drive motors 44A, 44B, such as an air motor with suitable gear reduction means. The frame 28 is adapted to couple and be fixed relative to a pipe, and the tool carrier 32 is rotatable relative to the fixed frame 28 and the pipe. The motors 44A, 44B are adapted to rotate the tool carrier 32 relative to the frame 28 through a gear train.

The rotatable tool carrier 32 includes one or more tool supports 48 (two tool supports 48 shown in the illustrated exemplary embodiment), which support tools 52 for performing a cutting or machining operation on the pipe as the tools 52 rotate circumferentially about the pipe. The tool supports 48 are coupled to the tool carrier 32 by a plurality of fasteners 116. The machining operation performed by the tool(s) 52 may form a straight edge substantially perpendicular to a longitudinal extent of the pipe, a bevel on an end of the pipe that is transverse to and at an angle other than ninety degrees to the longitudinal extent of the pipe, or an edge of a pipe having any angle.

With continued reference to FIGS. 1-3, it can be seen that tool carrier 32 has a circular gear rack 56 for meshing with the pinion gears 40A, 40B coupled to the motors 44A, 44B. Therefore, it can be seen that drive motors 44A, 44B are adapted to rotate tool carrier 32 relative to the frame 28 through a gear train provided by pinion gears 40A, 40B and circular gear rack 56 on the tool carrier 32.

The apparatus 20 further includes a plurality of coupling members 68 engageable with an exterior of the pipe and having suitable adjustability to couple and concentrically or axially locate the apparatus 20 to the exterior of the pipe. The coupling members 68 are also positionable on the apparatus 20 to engage an interior of the pipe and are suitably adjustable to couple and concentrically or axially locate the apparatus 20 to the interior of the pipe.

Figure 5:
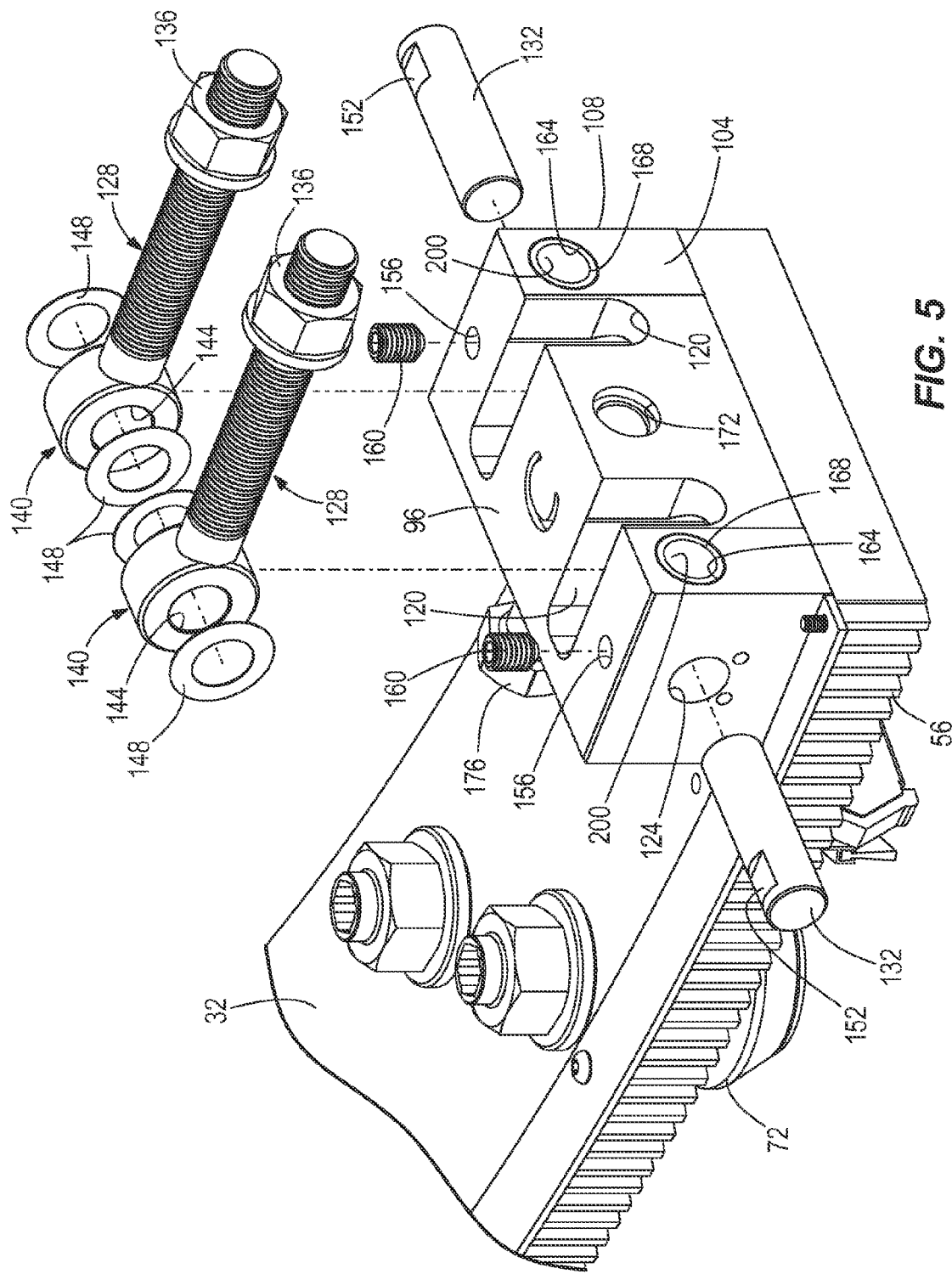
FIG. 5 is an exploded view of a portion of the coupling mechanism illustrated in FIG. 4, in accordance with one embodiment.
Figure 6:
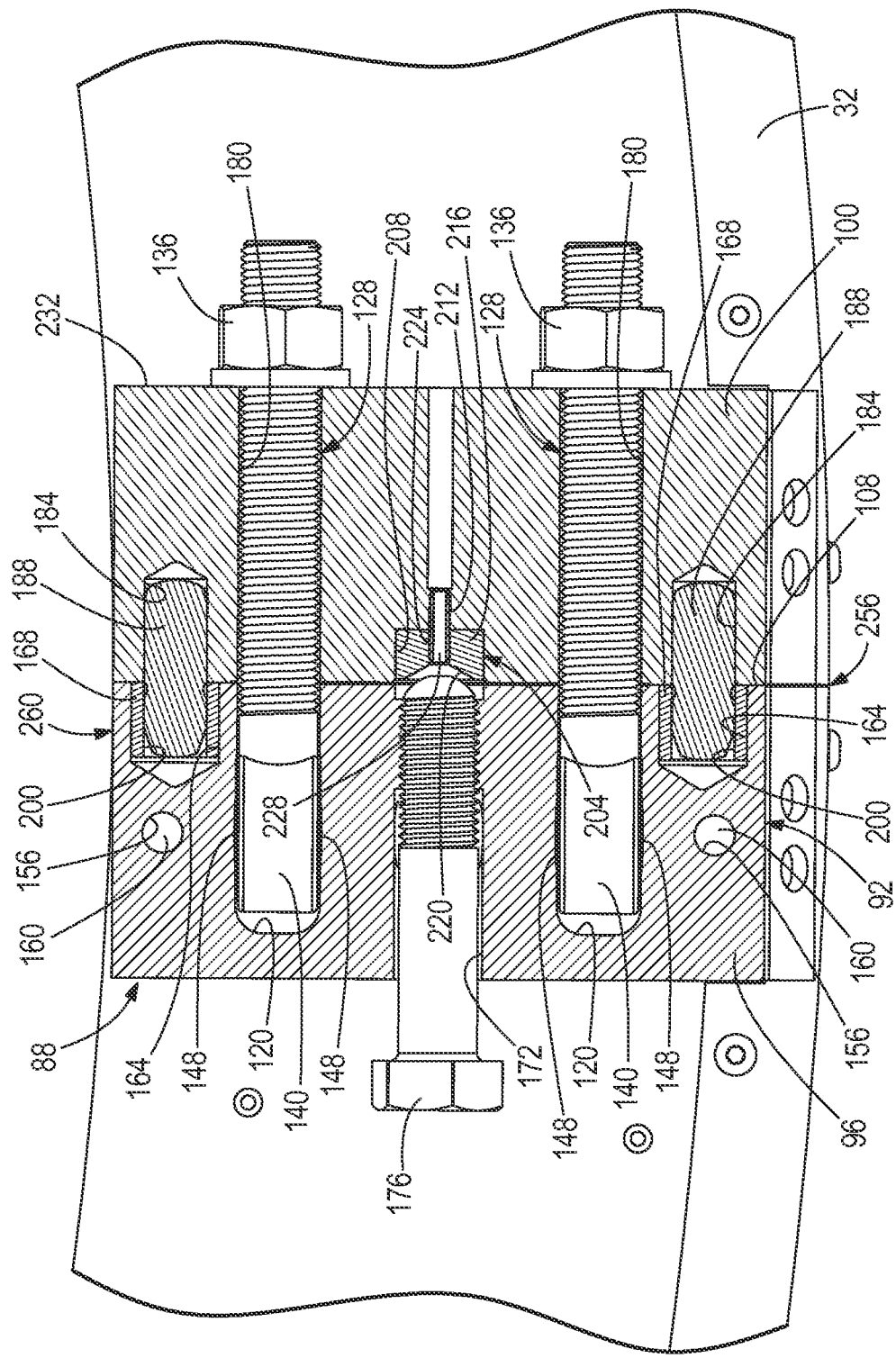
FIG. 6 is a cross-sectional view taken through the coupling mechanism illustrated in FIG. 4 with the coupling mechanism shown in a coupled position, in accordance with one embodiment.

Tool carrier 32 is rotatably mounted on and supported by frame 28 by a plurality of roller bearings 72. The roller bearings 72 ride in a circular bearing race 76 on the interior of tool carrier 32. An exemplary race 76 and exemplary roller bearings 72 can be seen in FIGS. 5 and 11.

The apparatus 20 also includes an advancement mechanism 80 that is adjustable into and out of a path of an advancement member 84 coupled to each tool support 48 to advance the tool 52 toward the pipe.

With continued reference to FIGS. 1-3 and further reference to FIGS. 4-8, the pipe machining apparatus 20 further includes a plurality of coupling mechanisms 88 positioned at the parting lines 108 where the four joined-together sections 24A, 24B, 24C, 24D abut. The coupling mechanisms 88 assist with coupling the four sections 24A, 24B, 24C, 24D together and maintaining them together during operation of the pipe machining apparatus 20. In the illustrated exemplary embodiment, the pipe machining apparatus 20 includes four coupling mechanisms 88, one at each parting line 108, to couple four sections 24A, 24B, 24C, 24D together. In other exemplary embodiments, the pipe machining apparatus 20 may include a different quantity of sections and correspondingly include the same number of coupling mechanisms, one at each parting line, to couple the sections together. Thus, it is understood that the pipe machining apparatus 20 is capable of having any number of sections and any number of coupling mechanisms and still be within the spirit and scope of the present disclosure.

The coupling mechanisms 88 included in the pipe machining apparatus 20 are substantially identical in structure and operation. Thus, only one of the coupling mechanisms 88 will be described herein in detail with the understanding that the description and drawings included herein may apply to all of the coupling mechanisms 88 of the pipe machining apparatus 20.

Each coupling mechanism 88 includes a base 92 coupled to the tool carrier 32. The base 92 is comprised of a first base member 96 coupled to one of the sections 24A and a second base member 100 coupled to another one of the sections 24B. The first base member 96 includes an abutment surface 104 generally flush and co-planer with a parting line 108 between sections 24A, 24B and the second base member 100 includes an abutment surface 112 generally flush and co-planer with the parting line 108. When the coupling mechanism 88 couples the two sections 24A, 24B together, the abutment surfaces 104, 112 of the first and second base members 96, 100 abut each other.

The first base member 96 defines a pair of slots 120 therein and an aperture 124 in communication with and transverse to the pair of slots 120. The coupling mechanism 88 also includes a pair of coupling arms 128 positioned and rotatable within the slots 120, and a pair of axles 132 with one axle 132 positioned in each end of the aperture 124. Each coupling arm 128 includes a threaded portion, an adjustable engagement member 136 threadable along the threaded portion, and a hub member 140 defining an opening 144 there through for receiving a respective one of the axles 132. The axles 132 are positioned in respective ends of the aperture 124 and extend through a respective slot 120 to position the axels 132 in the hub member 140 of the respective coupling arm 128. The coupling arms 128 are adapted to rotate about the axles 132. Four resistance members 148 are included in the coupling mechanism 88 with one resistance member 148 positioned on each side of a hub member 140 between the hub member 140 and an interior surface of the slot 120. The resistance members 148 provide sufficient friction or resistance to retain the coupling arms 128 in position under the force of gravity. That is, the coupling arms 128 will remain in place when released by a user and external force, such as that applied by a user, is required to move the coupling arms 128. This feature assists with coupling and uncoupling the coupling mechanism 88 by keeping the coupling arms 128 out of the way. The resistance members 148 may be a wide variety of different types of resistance members and may be made of a variety of different materials. In some exemplary embodiments, the resistance members 148 may be made of high carbon steel. Alternatively, the resistance member 148 may be made of polyurethane or any other appropriate material. The resistance members 148 may also be generally flat or may be generally frusto-conical in shape.

The axles 132 are generally cylindrical in shape and each axle 132 includes a cutout portion or flat portion 152 aligned with a respective aperture 156 in which a threaded fastener 160 is positioned and threadable within. The threaded fasteners 160 may be threaded into the apertures 156 to engage and inhibit rotation and axial translation of the axles 132 relative to the base 92. The fasteners 160 may also be threaded away from and out of contact with the axles 132 to allow the axles 132 to rotate and axially translate within the aperture 124.

The first base member 96 also defines a pair of recesses 164 defined in the abutment surface 104. The coupling mechanism 88 further includes a pair of sleeves 168 with one sleeve 168 positioned in each of the recesses 164. Furthermore, the first base member 96 defines an aperture 172 there through transverse to the axle aperture 124 and positioned between the pair of slots 120. The coupling mechanism 88 includes a separation member 176 positioned within the aperture 172 and movable along and within the aperture 172. The axles 132 are sized appropriately not to extend into the aperture 172 and engage or interfere with the threaded fastener 176. In the illustrated exemplary embodiment, the separation member 176 is a threaded fastener that is adapted to threadably move along and within the aperture 172. Alternatively, the separation member 176 may be a wide variety of other devices adapted to move in a variety of different manners and all of such possibilities are intended to be within the spirit and scope of the present disclosure.

With continued reference to FIGS. 1-8, the second base member 100 defines a pair of slots 180 aligned with the slots 120 in the first base member 96. The slots 180 in the second base member 100 are adapted to receive the coupling arms 128 therein. The second base member 100 also defines a pair of recesses 184 in the abutment surface 112 aligned with the recesses 164 defined in the first base member 96. The coupling mechanism 88 also includes a pair of pins 188 with first ends 192 of the pins 188 positioned and secured within the recesses 184 defined in the second base member 100. Second opposite ends 196 of the pins 188 are removably positionable within receptacles 200 defined in the sleeves 168 positioned within the recesses 164 defined in the first base member 96. Furthermore, the second base member 100 defines an aperture 204 therein aligned with the aperture 172 defined in the first base member 96. The aperture 204 includes a first portion 208 having a first diameter and a second portion 212 having a second diameter less than the first diameter. The coupling mechanism 88 further includes an engagement member or cup 216 positioned within the first portion 208 of the aperture 204. The engagement member 216 includes a concave surface 220 in one surface thereof and defines an opening 224 there through in which a pin 228 is frictionally secured. The pin 228 is positioned within and frictionally secured in the second portion 212 of the aperture 204 to secure the engagement member 216 to the second base member 100. The engagement member 216 may be made of a wide variety of materials and be within the intended spirit and scope of the present disclosure. In some exemplary embodiments, the engagement member 216 may be made of bronze.

The coupling mechanism 88 is moveable between a coupled position and an uncoupled position. In the coupled position, the coupling arms 128 are swung down to position them in the aligned slots 120, 180 with the adjustable engagement members 136 threadably tightened against a surface 232 of the second base member 100. To uncouple the coupling mechanism 88, the adjustable engagement members 136 are unthreaded along the coupling arms 128 away from the surface 232 of the second base member 100 and the coupling arms 128 are swung out of the slots 120, 180 defined in the second base member 100. The resistance members 148 provide sufficient resistance to retain the coupling arms 128 in their positions out of the slots 120, 180 such that the arms 128 do not fall back into the slots 120, 180 when a user releases the coupling arms 128.

At this point, the two sections 24A, 24B of the pipe machining apparatus 20 may be separated and moved to another uncoupled position where the two sections 24A, 24B are completely disengaged from each other. In some instances, the pipe machining apparatus 20 and the sections 24A, 24B may be relatively heavy and significant friction or resistance to separation may exist. Moreover, it is desirable to move the two sections 24A, 24B generally straight away from each other and in a controlled, reliable manner at least until the pins 188 substantially clear the sleeves 168 to inhibit deforming the pins 188. Conventional split frame pipe machining apparatuses have dowel pins connecting sections of the apparatuses at the parting lines and such pins are often bent or otherwise deformed when sections are coupled together or uncoupled from each other.

Figure 7:
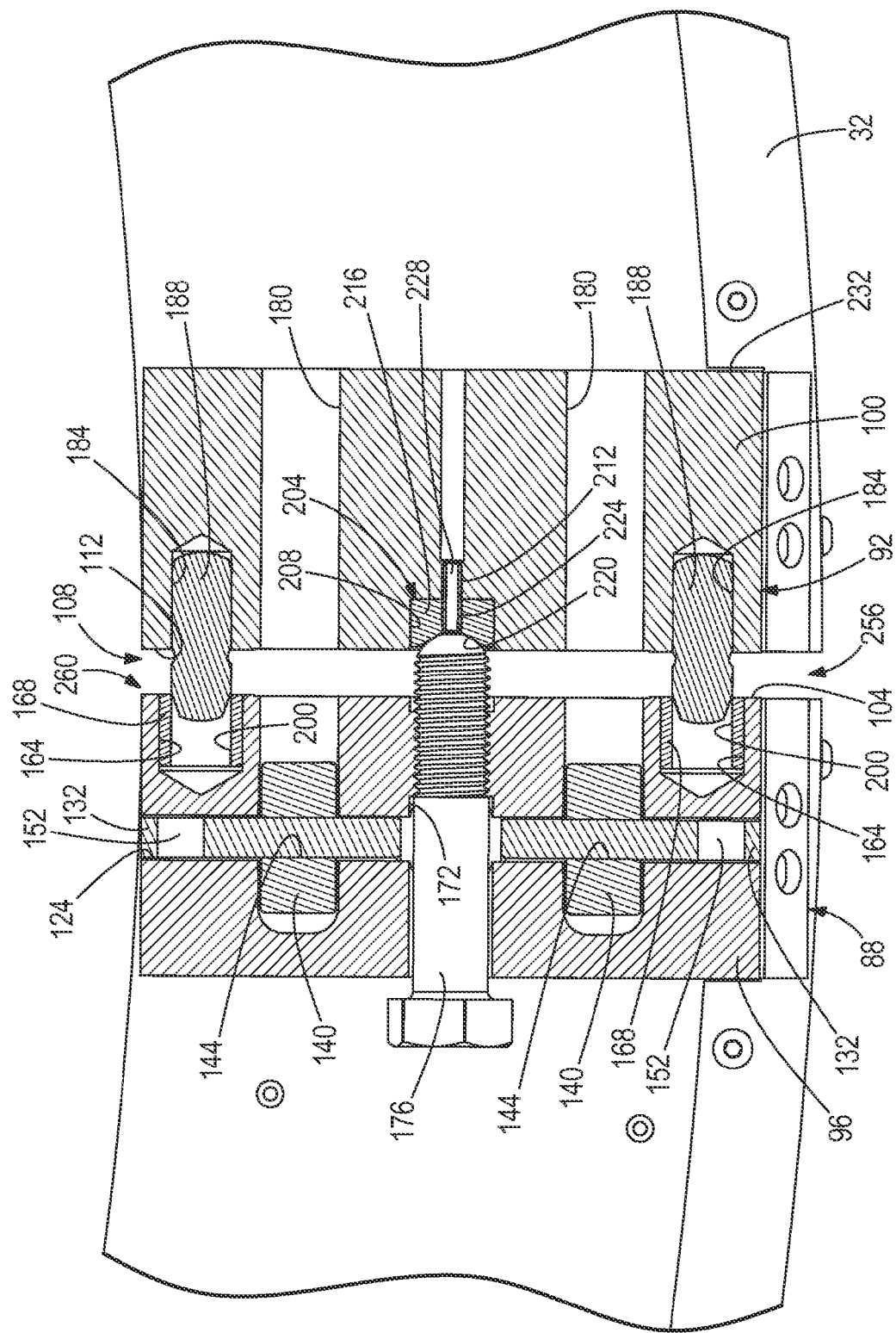
FIG. 7 is a cross-sectional view similar to FIG. 6 of the coupling mechanism illustrated in FIG. 4 with the coupling mechanism shown in another uncoupled position, in accordance with one embodiment.
Figure 8:
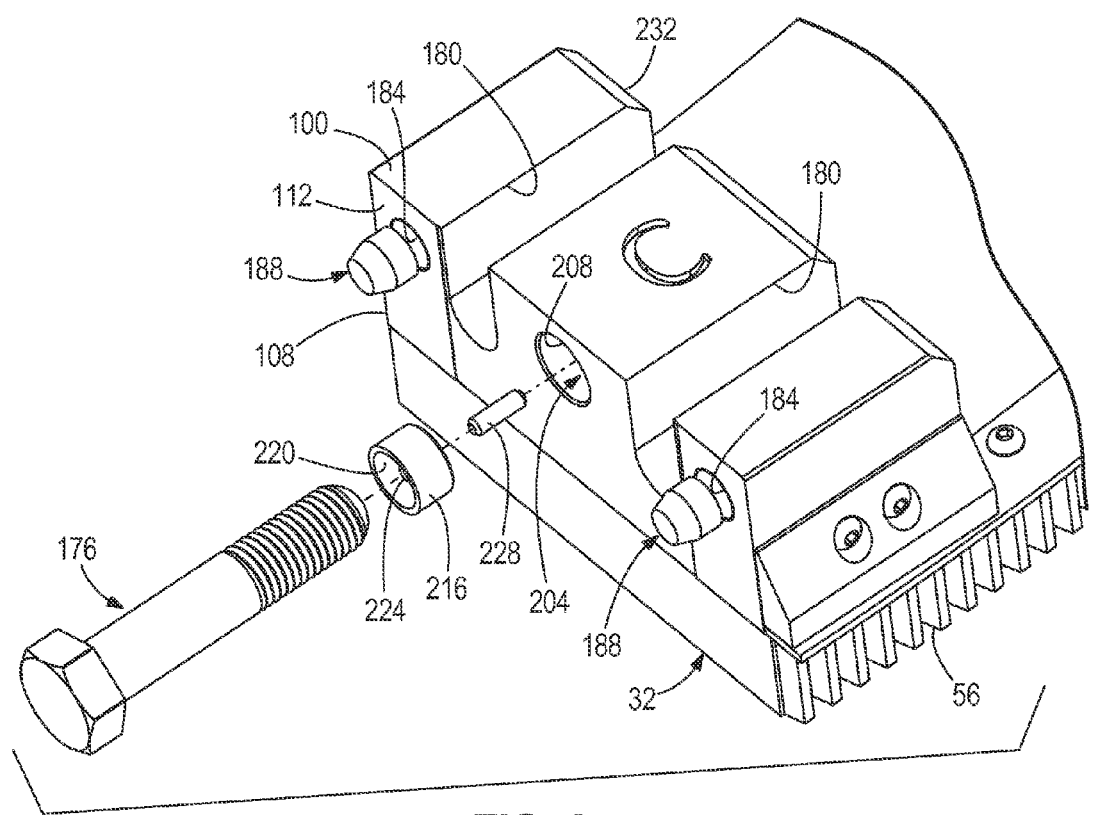
FIG. 8 is an exploded view of a portion of the coupling mechanism illustrated in FIG. 4, in accordance with one embodiment.

The threaded fastener 176 and engagement member 216 of the coupling mechanism 88 are provided to assist with separating the two sections 24A, 24B. The threaded fastener 176 threads into the aperture 172 to engage an end of the fastener 176 with the concave surface 220 of the engagement member 216. The fastener 176 threads further into the aperture 172, thereby pressing against the engagement member 216 and resulting in the two sections 24A, 24B moving apart as shown in FIG. 7. As the two sections 24A, 24B move apart, the pins 188 secured to the second base member 100 draw out of the sleeves 168 secured to the first base member 96 generally along a straight line, at least initially, and in a controlled and reliable manner. The fastener 176 may be threaded as desired to provide the desired amount of separation. In some instances, the fastener 176 may be threaded until the pins 188 are completely drawn out from the sleeves 168. In other instances, the fastener 176 may be threaded to begin withdrawal of the pins 188 from the sleeves 168 and then separation of the two sections 24A, 24B may be completed in some other manner. When recoupling the two sections 24A, 24B together, the fastener 176 must be sufficiently retracted within the aperture 172 so as not to interfere or engage the engagement member 216 and facilitate a tight abutment of the first and second base members 96, 100.

Figure 9:
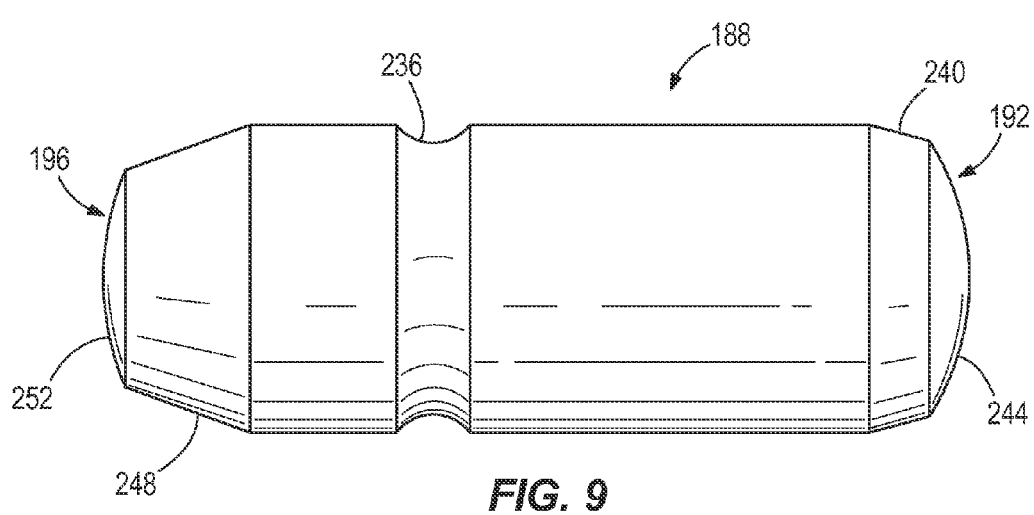
FIG. 9 is an elevational view of a pin included in the coupling mechanism illustrated in FIG. 4, in accordance with one embodiment.

Referring now to FIG. 9, one of the pins 188 secured to the second base member 100 is illustrated and will be described in greater detail. The pins 188 are substantially identical in structure and operation. Thus, only one of the pins 188 will be described herein in detail with the understanding that the description and drawings included herein apply to all of the pins 188 of the pipe machining apparatus 20.

The pin 188 is generally cylindrical in shape and defines a groove or recess 236 encircling the pin 188 between the first end 192 and the second end 196. The first end 192 is press-fit or otherwise frictionally secured within the recess 184 in the second base member 100 and the second end 196 is removably received in the receptacle 200 of the sleeve 168 positioned in the first base member 96. The groove 236 is closer to the second end 196 than the first end 192. The pin 188 includes a first angled portion 240 near the first end 192 that decreases in diameter as it approaches the first end 192 of the pin 188, and a first round portion 244 at the first end 192 of the pin 188. The pin 188 also includes a second angled portion 248 decreasing in diameter as it approaches the second end 196 of the pin 188, and a second rounded portion 252 at the second end 196 of the pin 188. This configuration of the second angled portion 248 and second round portion 252 acts as a lead-in as it inserts into and is removed from the sleeve 168 to facilitate easier insertion and removal from the sleeve 168.

Moreover, in some instances, the two sections 24A, 24B may not separate from each other in a linear or straight manner and the second angled portion 248 and the second rounded portion 252 accommodate such non-linear separation. More particularly, the two sections 24A, 24B may separate along an arcuate path rather than straight away from one another. That is, for example, an outer edge 256 of the coupling mechanism 88 may separate from an inner edge 260 of the coupling mechanism 88 at a greater rate or amount, thereby positioning the abutment surfaces 104, 112 of the first and second base members 96, 100 at an angle to each other rather than parallel to each other during separation. In such an instance, the pin 188 will not be removed from the sleeve 168 along a linear path. Rather, the pin 188 will roll out or move out of the sleeve 168 along an arcuate path. The second angled portion 248 and the second rounded portion 252 of the pin 188 allow the pin 188 to move out of the sleeve 168 along an arcuate path without significant interference or engagement with the sleeve 168. Without the second angled portion 248 and the second rounded portion 252, significant engagement may occur between the pin 188 and the sleeve 168 potentially resulting in deformation or other damage to the pin 188 and/or the sleeve 168.

Figure 10:
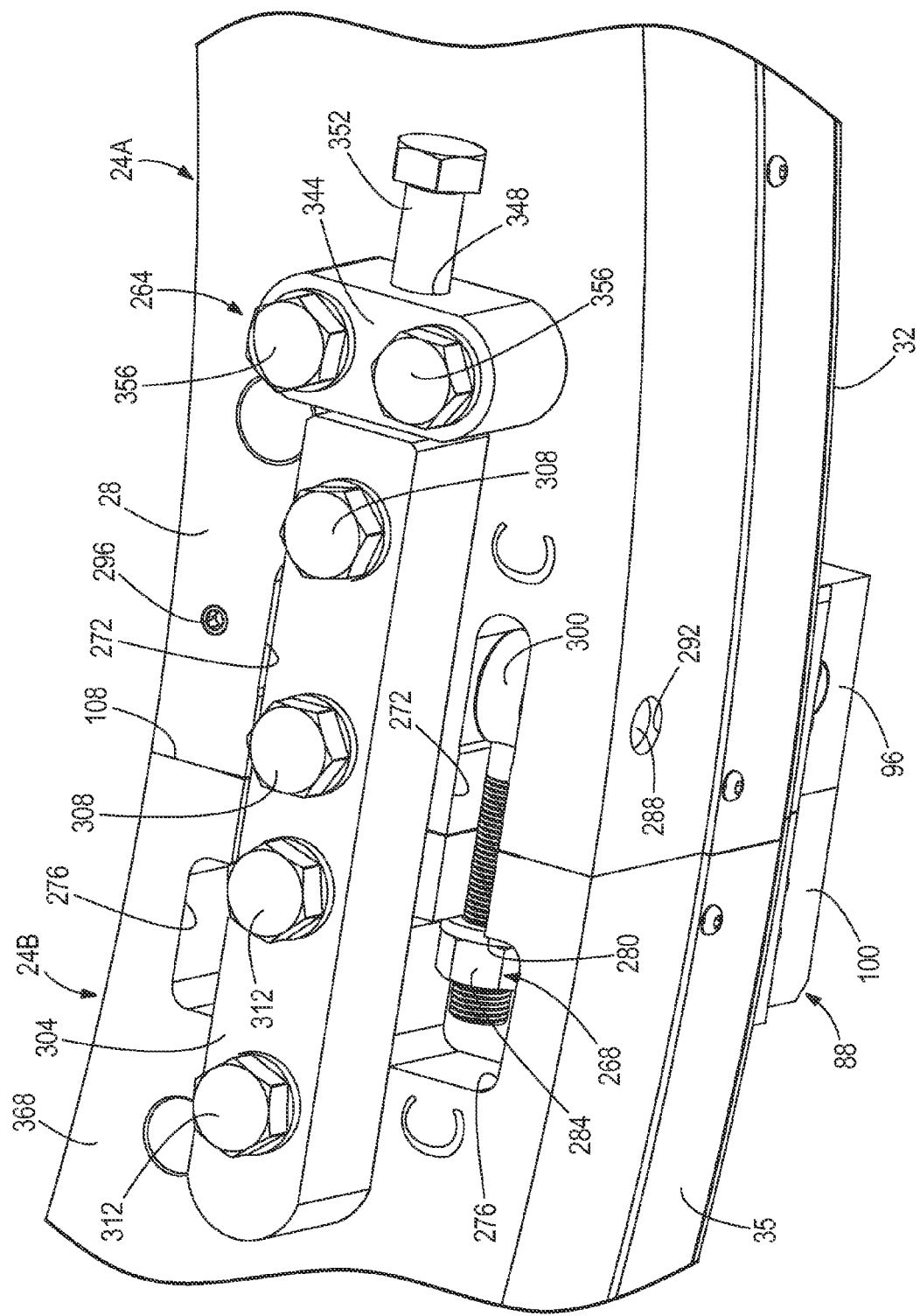
FIG. 10 is a rear perspective view of another exemplary coupling mechanism of the pipe machining apparatus illustrated in FIG. 1 with the coupling mechanism shown in a coupled position, in accordance with one embodiment.
Figure 11:
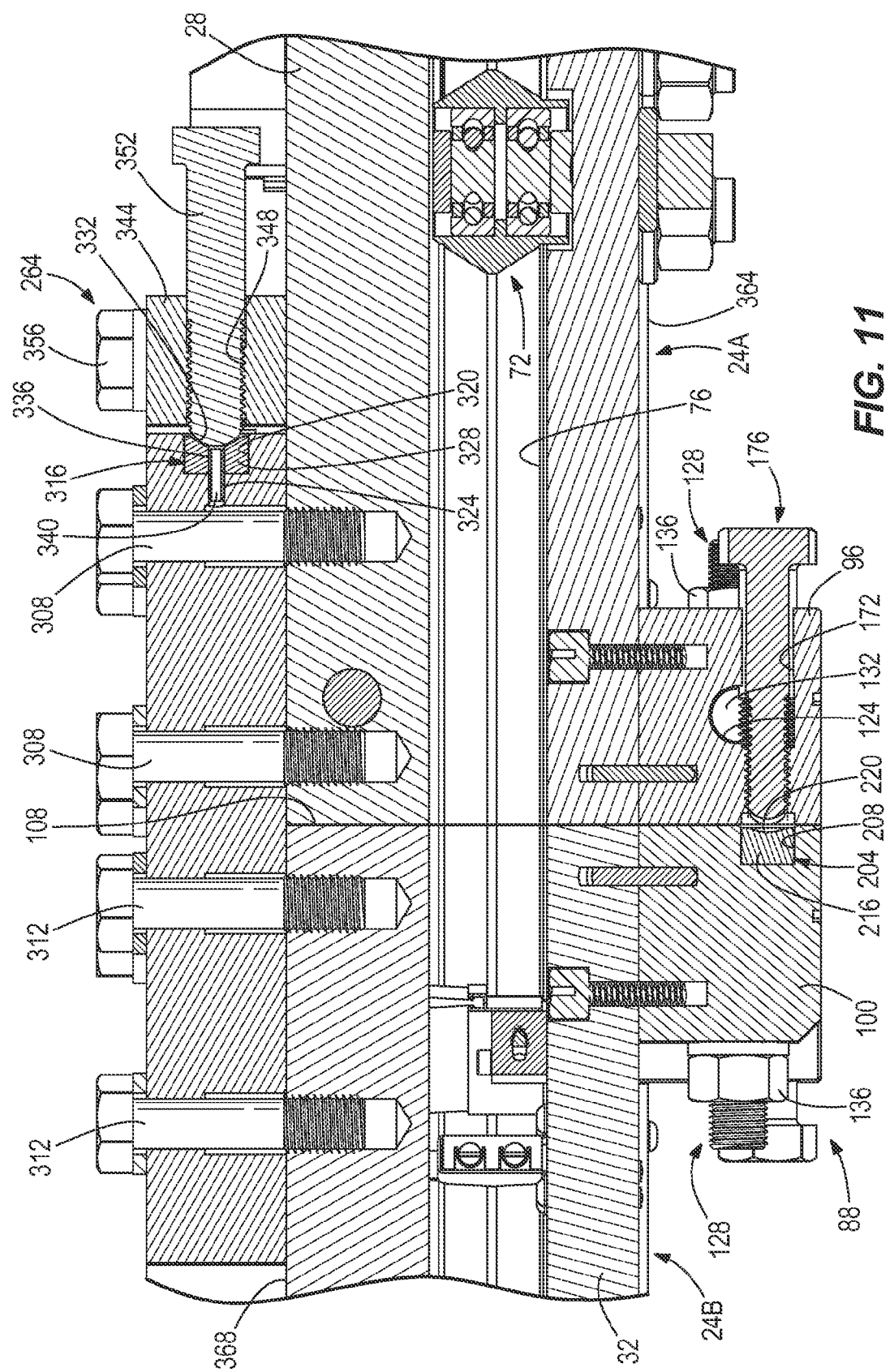
FIG. 11 is a cross-sectional view taken through the two coupling mechanisms shown in FIGS. 4 and 10 with both coupling mechanisms shown in coupled positions, in accordance with one embodiment.

Referring now to FIGS. 2, 10, and 11, the pipe machining apparatus 20 includes a plurality of second coupling mechanisms 264 for coupling together the plurality of sections 24A, 24B, 24C, 24D. In the illustrated exemplary embodiment, the pipe machining apparatus 20 includes four second coupling mechanisms 264 to couple the four sections 24A, 24B, 24C, 24D together. In other embodiments, the pipe machining apparatus 20 may include a different quantity of sections and correspondingly include the same number of second coupling mechanisms to couple the sections together. Thus, it is understood that the pipe machining apparatus 20 is capable of having any number of sections and any number of second coupling mechanisms and still be within the spirit and scope of the present disclosure.

The second coupling mechanisms 264 included in the pipe machining apparatus 20 are substantially identical in structure and operation. Thus, only one of the second coupling mechanisms 264 will be described herein in detail with the understanding that the description and drawings included herein apply to all of the second coupling mechanisms 264 of the pipe machining apparatus 20.

The second coupling mechanism 264 is positioned on an opposite surface of the pipe machining apparatus 20 from the first coupling mechanism 88 and is coupled to the frame 28. The second coupling mechanism 264 includes a pair of coupling arms 268 generally similar in structure and operation to the coupling arms 128 of the first coupling mechanism 88. The coupling arms 268 are positioned and rotatable within aligned slots 272, 276 defined in the frame 28 of two abutting sections 24A, 24B. The frame 28 of one of the sections 24B includes a surface 280 that is engageable by engagement members 284 of the coupling arms 268. In this exemplary embodiment, a single axle 288 is positioned in an aperture 292 defined through the frame 28 of one of the sections 24A and is transverse to the slots 272, 276. The coupling arms 268 are adapted to rotate about the axle 288. A single threaded fastener 296 is threadable into and out of engagement with the axle 288 to selectively inhibit rotation and axial translation of the axle 288. In other exemplary embodiments, two axles can be used in a similar manner as that incorporated with the first coupling mechanism 88. In such other embodiments, two threaded fasteners may be used to selectively engage the two axles to inhibit rotation and axial translation of the two axles. Resistance members are located between hub members 300 of the coupling arms 268 and interior surfaces of the slots 272, 276 in a similar manner to the first coupling mechanism 88 to achieve similar results.

The second coupling mechanism 264 also includes a base 304 coupled to the frame 28 across the parting line 108 by a plurality of fasteners 308, 312. In the illustrated exemplary embodiment, the base 304 is coupled to the frame 28 with four fasteners 308, 312. Two of the fasteners 308 couple the base 304 to one section 24A and two fasteners 312 couple the base 304 to another section 24B. Alternatively, any number of fasteners may be used to couple the base 304 to the frame 28. By coupling the base 304 across the parting line 108 in this manner, the base 304 provides additional rigidity and strength to this side of the apparatus 20 at the parting line 108. The base 304 defines an aperture 316 therein including a first portion 320 having a first diameter and a second portion 324 including a second diameter smaller than the first diameter. The second coupling mechanism 264 further includes an engagement member or cup 328 positioned in the first portion 320 of the aperture 316 that includes a concave surface 332 and an opening 336 there through. A pin 340 is press-fit or otherwise frictionally secured in the opening 336 and press-fit or otherwise frictionally secured in the second portion 324 of the aperture 316 to secure the engagement member 328 to the base 304. The engagement member 328 may be made of a wide variety of materials and be within the intended spirit and scope of the present disclosure. In some exemplary embodiments, the engagement member 328 may be made of bronze.

The second coupling member 264 also includes a second base member 344 defining a threaded aperture 348 there through and a separation member 352 positioned and movable within the threaded aperture 348. In the illustrated exemplary embodiment, the separation member 352 is a threaded fastener that is adapted to threadably move along and within the aperture 348. Alternatively, the separation member 352 may be a wide variety of other devices adapted to move in a variety of different manners and all of such possibilities are intended to be within the spirit and scope of the present disclosure. The second base member 344 is coupled to the frame 28 with two fasteners 356 with the threaded aperture 348 defined in the second base member 344 between the two fasteners 356. The threaded aperture 348 and the threaded fastener 352 are aligned with the engagement member 328. The threaded fastener 352 and the engagement member 328 interact to assist with separation of the two sections 24A, 24B in a similar manner to the threaded fastener 176 and the engagement member 216 of the first coupling mechanism 88. Prior to utilizing the threaded fastener 352 and the engagement member 328 to separate the two sections 24A, 24B, the two fasteners 308 used to couple the base 304 to the section 24A must be uncoupled from the frame 28 (the two fasteners on the right as viewed in FIG. 11). After these two fasteners 308 are uncoupled from the frame 28, the threaded fastener 352 may be rotated to push against the engagement member 328 and move the base 304 and section 24B away from the second base member 344 and section 24A.

Figure 12:
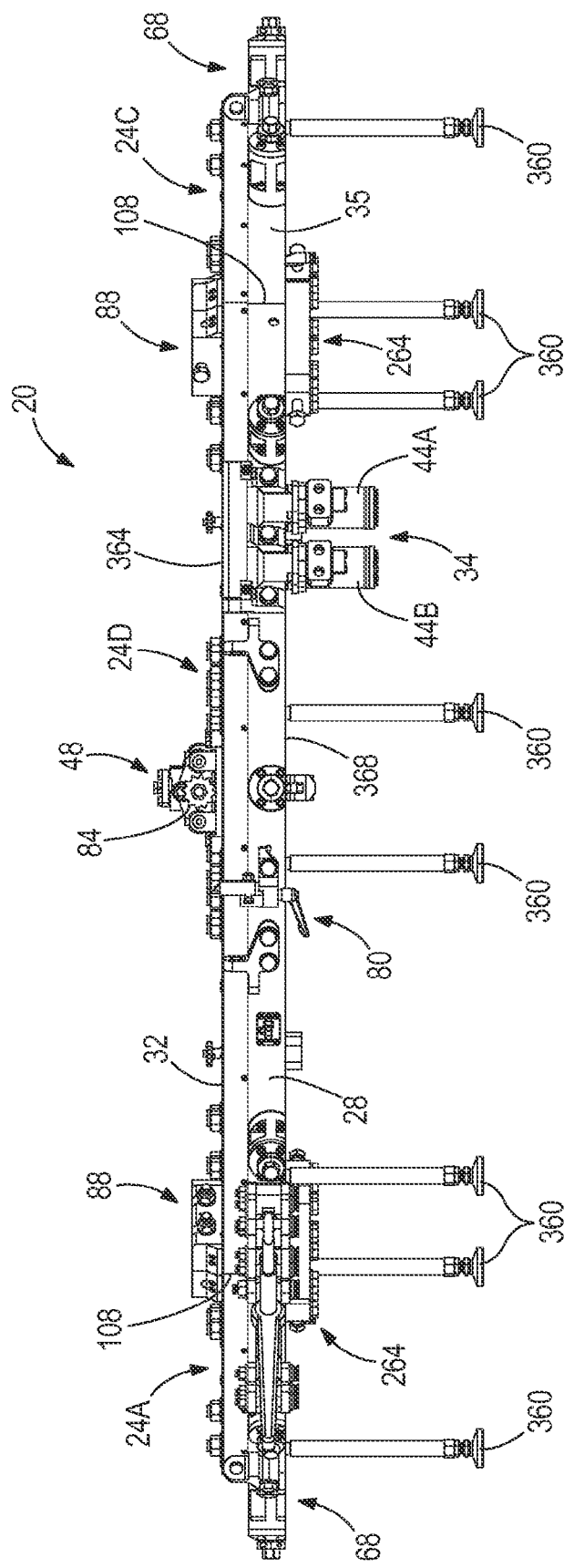
FIG. 12 is an elevational view of the pipe machining apparatus illustrated in FIG. 1, in accordance with one embodiment.

Referring now to FIGS. 1, 2, and 12, the pipe machining apparatus 20 is illustrated and includes a low profile (i.e., the apparatus is relatively thin or narrow when viewed from a side or end). The apparatus 20 is shown in FIG. 12 with a plurality of setup legs 360 utilized during assembly, set up, and disassembly of the apparatus 20. The set up legs 360 are removed when installed on or coupled to a pipe. The low profile of the pipe machining apparatus 20 provides the apparatus 20 with the ability to be used in low clearance environments. Low clearance environments may include, for example, small or tight spaces, closely positioned or densely packed pipes, or some other environments that do not have significant space surrounding the pipe to which the apparatus 20 is secured. The apparatus 20 includes a low profile because the components coupled to and extending from the tool carrier 32 and frame 28 do not protrude a large distance. On one surface of the apparatus 20, the tool support 48 is the item that protrudes the most therefrom and on the opposite surface the motors 44A, 44B extend the greatest distance therefrom. A thickness or profile of the apparatus 20 may be defined between a surface 364 of the tool carrier 32 and a surface 368 of the frame 28. In some exemplary embodiments, this thickness or profile may be about 4.8 inches. In other exemplary embodiments, this thickness may be less than about 4.8 inches. In further exemplary embodiments, this thickness may be greater than about 4.8 inches.

The components and resulting functionalities of the pipe machining apparatus included herein are adapted to be included in any size pipe machining apparatus to machine any size pipe and operate in the same manner, thereby providing a modularity capability to the present disclosure. That is, for example, whether the pipe machining apparatus is adapted to cut pipes of 60 inches or 120 inches, the first coupling mechanisms, the second coupling mechanisms, the pins, the resistance members and coupling arms, etc., are all adapted to be included in any possible size pipe machining apparatus and operate in the same manner.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus may be utilized in any orientation and use of such terms is intended to correspond to the exemplary orientation of the pipe machining apparatus illustrated in the drawings. The use of these terms in association with the pipe machining apparatus is not intended to limit the pipe machining apparatus to a single orientation or to limit the pipe machining apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
   a first section including a first portion of a frame and a first portion of a tool carrier;
   a second section including a second portion of the frame and a second portion of the tool carrier, wherein the first section and the second section are adapted to be coupled together around at least a portion of a pipe, and wherein the frame is adapted to be fixed relative to the pipe and the tool carrier is adapted to move relative to the frame and the pipe; and
   a coupling mechanism adapted to couple the first section and the second section together, the coupling mechanism including
      a base coupled to one of the frame and the tool carrier and defining an aperture therein;
      an arm movably coupled to one of the first section and the second section and adapted to selectively couple the first and second sections together;
      an engagement member positioned in the aperture in the base; and
      a separation member movably coupled to the base and adapted to engage the engagement member, wherein the separation member is adapted to move to push against the engagement member and separate the first section and the second section.

2. The pipe machining apparatus of claim 1, wherein the engagement member includes a concave surface and the separation member is adapted to engage the concave surface of the engagement member.

3. The pipe machining apparatus of claim 1, wherein the separation member is a threaded fastener that is threadably coupled to the base.

4. The pipe machining apparatus of claim 1, wherein the base includes a first base member coupled to the first portion of the tool carrier and a second base member coupled to the second portion of the tool carrier, and wherein the separation member is movably coupled to the first base member and the aperture is defined in the second base member.

5. The pipe machining apparatus of claim 4, wherein the arm is rotatably coupled to the first base member and is adapted to engage the second base member to couple the first section and the second section together.

6. The pipe machining apparatus of claim 1, wherein the base includes a first base member coupled to both the first portion of the frame and the second portion of the frame and a second base member coupled to the first portion of the frame, and wherein the separation member is movably coupled to the second base member and the aperture is defined in the first base member.

7. The pipe machining apparatus of claim 6, wherein the arm is rotatably coupled to the first portion of the frame and is adapted to engage the second portion of the frame to couple the first section and the second section together.

8. The pipe machining apparatus of claim 6, wherein the first base member is uncoupled from the first portion of the frame prior to separation of the first section and the second section.

9. A coupling mechanism for coupling together a first section and a second section of a pipe machining apparatus, the coupling member comprising:
  a base defining an aperture therein;
  an arm movably coupled to one of the first section and the second section and adapted to selectively couple the first and second sections together;
  an engagement member positioned in the aperture in the base; and
  a separation member movably coupled to the base and adapted to engage the engagement member, wherein the separation member is adapted to move to push against the engagement member and separate the first section and the second section.

10. The coupling mechanism of claim 9, wherein the engagement member includes a concave surface and the separation member is a threaded fastener, wherein the threaded fastener is threadably coupled to the base and is adapted to engage the concave surface of the engagement member.

11. The coupling mechanism of claim 9, wherein the base includes a first base member adapted to couple to the first section and a second base member adapted to couple to the second section, wherein the separation member is movably coupled to the first base member and the aperture is defined in the second base member, and wherein the arm is rotatably coupled to the first base member and is adapted to engage the second base member to couple the first section and the second section together.

12. The coupling mechanism of claim 9, wherein the base includes a first base member adapted to couple to both the first section and the second section and a second base member adapted to couple to the first section, and wherein the separation member is movably coupled to the second base member and the aperture is defined in the first base member, and wherein the arm is rotatably coupled to the first section and is adapted to engage the second section to couple the first section and the second section together.

13. The coupling mechanism of claim 12, wherein the first base member is uncoupled from the first section prior to separation of the first section and the second section.

14. A pipe machining apparatus comprising:
  a first section including a first portion of a frame and a first portion of a tool carrier;
  a second section including a second portion of the frame and a second portion of the tool carrier, wherein the first section and the second section are adapted to be coupled together around at least a portion of a pipe, and wherein the frame is adapted to be fixed relative to the pipe and the tool carrier is adapted to move relative to the frame and the pipe; and
  a coupling mechanism adapted to couple the first section and the second section together, the coupling mechanism including
    an arm movably coupled to one of the first section and the second section and adapted to selectively couple the first and second sections together; and
    a resistance member engaging the arm and the one of the first section and the second section to which the arm is coupled;
  wherein the arm includes a hub member defining a hub aperture and the resistance member defines a resistance member aperture, the coupling mechanism further including an axle extending through the hub aperture and the resistance member aperture, and wherein the arm is adapted to rotate about the axle.

15. The pipe machining apparatus of claim 14, wherein the resistance member is frusto-conical in shape.

16. A pipe machining apparatus comprising:
  a first section including a first portion of a frame and a first portion of a tool carrier, the first section defining a first section recess therein;
  a second section including a second portion of the frame and a second portion of the tool carrier, the second section defining a second section recess therein, wherein the first section and the second section are adapted to be coupled together around at least a portion of a pipe; and
  a pin including a first end rigidly secured in one of the first section recess and the second section recess and a second end removably positionable in the other of the first section recess and the second section recess, wherein the pin includes an angled portion near the second end and a rounded portion at the second end.

17. The pipe machining apparatus of claim 16, wherein the pin defines a groove encircling the pin between the first end and the second end and further includes another angled portion near the first end and another rounded portion at the first end.

18. The pipe machining apparatus of claim 16, wherein the first section includes a first abutting surface and the second section includes a second abutting surface adapted to abut the first abutting surface with the first and second sections coupled together, wherein the pin longitudinally extends substantially perpendicular to the first and second abutting surfaces.

19. The pipe machining apparatus of claim 18, wherein the pin is rigidly secured in the second section recess.

* * * * *